March 24, 1936.  R. D. MAULIS  2,034,819
TIRE CHANGER
Filed Dec. 3, 1934    2 Sheets-Sheet 1
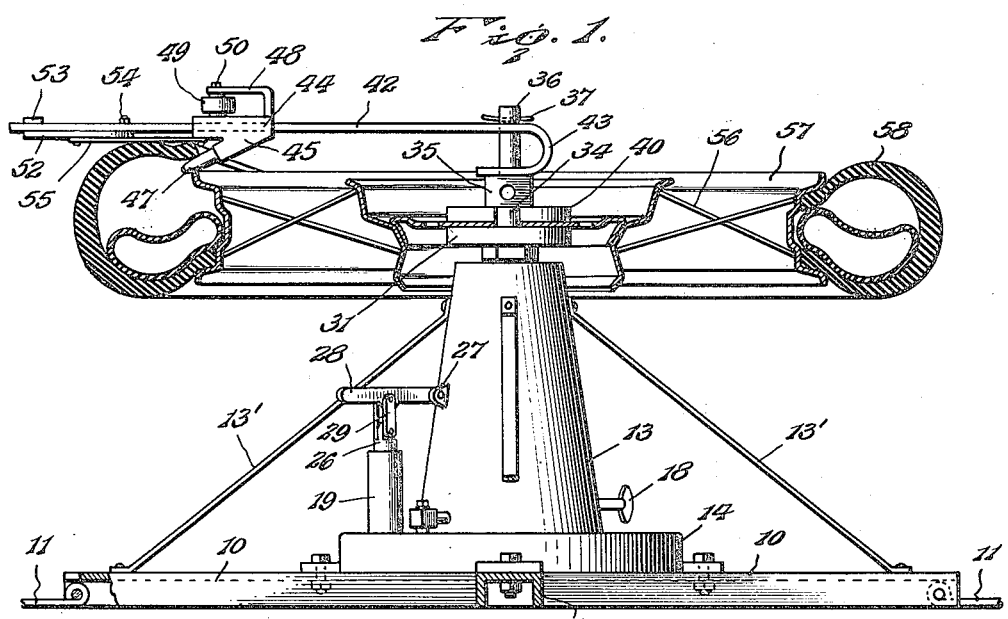
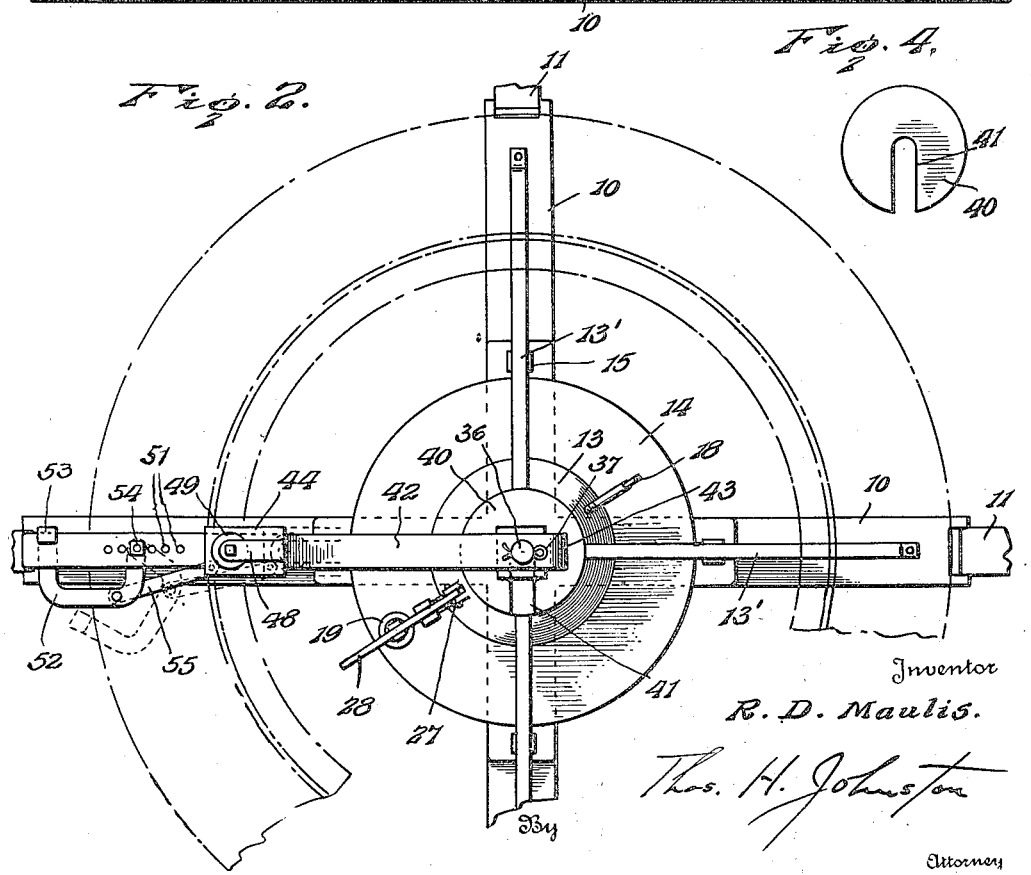
Inventor
R. D. Maulis.
By Thos. H. Johnston
Attorney

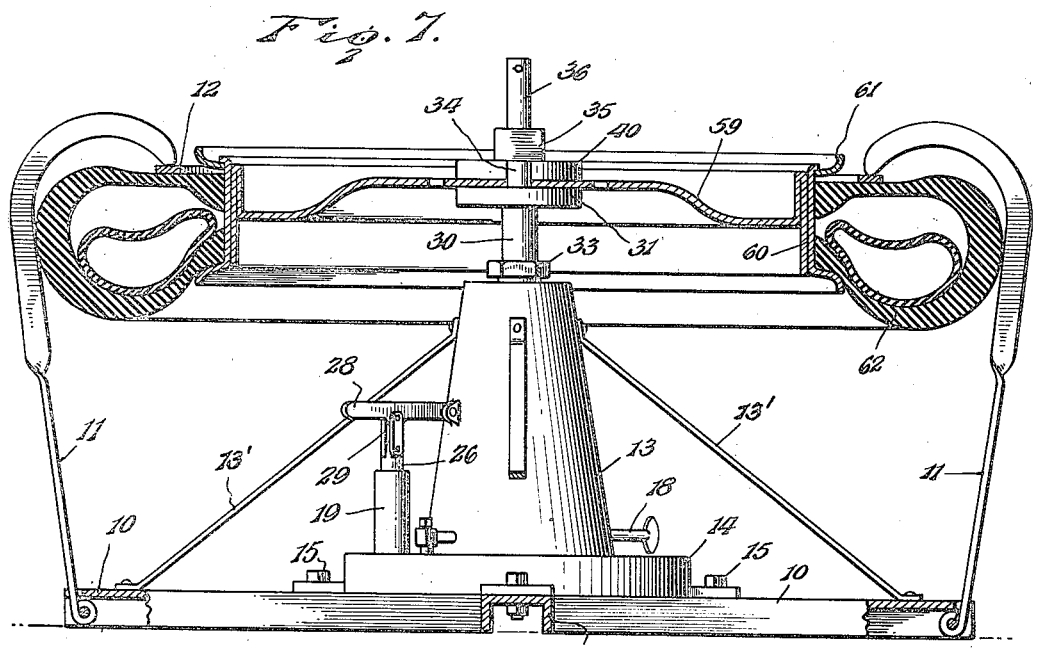
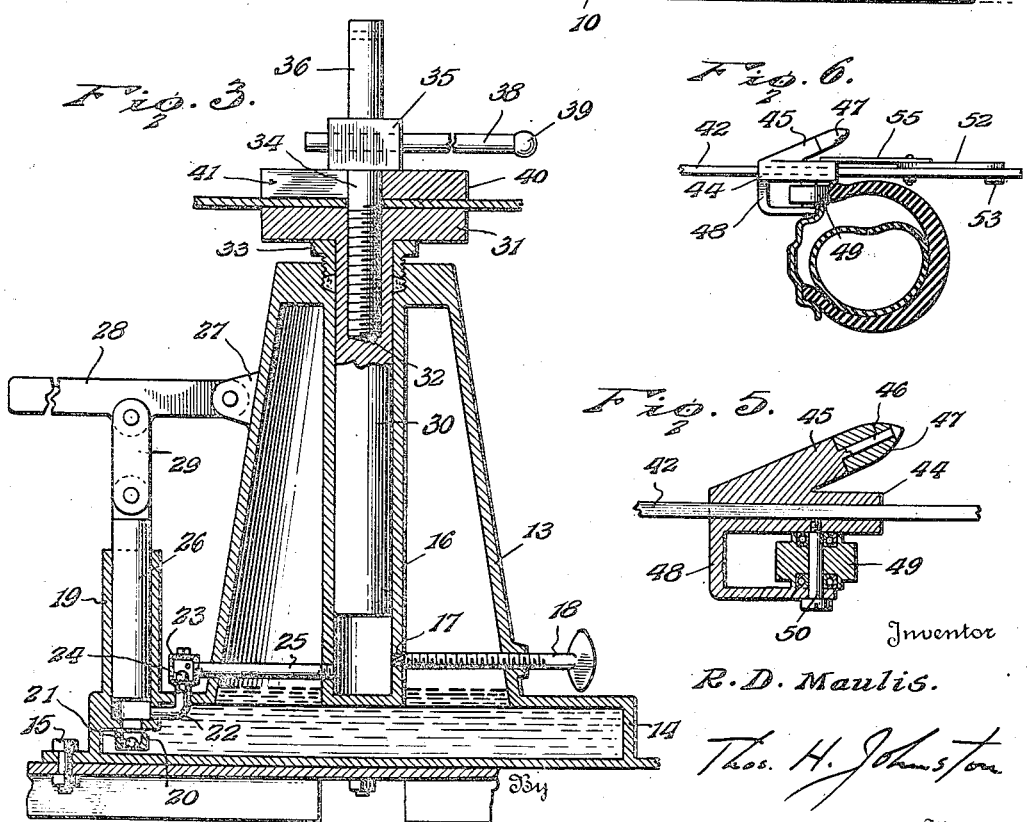

Patented Mar. 24, 1936

2,034,819

UNITED STATES PATENT OFFICE 2,034,819

TIRE CHANGER

Rudolph D. Maulis, Ravenna, Nebr.

Application December 3, 1934, Serial No. 755,830

7 Claims. (Cl. 157—6)

This invention relates to an improved tire changer and seeks, among other objects, to provide a device adapted for removing tires from or replacing tires on so-called drop center rims or rims of the type employing a locking ring for securing a tire in position thereon.

A further salient object of the invention is to provide a device which will not distort a wheel or rim, which will not injure the tire and, equally important, will not injure the inner tube.

Another object of the invention is to provide a device embodying a reversible sweep which, in one position, may be utilized for releasing one bead of a tire from a rim and which, when replacing the tire, may be reversed and utilized for pushing a free bead of the tire into engagement with the rim.

And the invention seeks, as a still further object, to provide a device which may be operated with ease and facility and which will be characterized by sturdiness and structural simplicity.

Other and incidental objects of the invention not specifically mentioned in the foregoing will appear as the description proceeds and in the drawings forming part of my application.

Figure 1 is a side elevation showing a conventional demountable wheel and tire in position on my improved device, parts being broken away and shown in section.

Figure 2 is a fragmentary plan view of the tire changer.

Figure 3 is a vertical sectional view showing the hydraulic pump and associated parts of the device.

Figure 4 is a plan view showing the slotted clamping plate employed for securing a wheel on the device.

Figure 5 is a detail sectional view of the sleeve of the sweep.

Figure 6 is a detail elevation showing the manner in which one roller of the sweep is employed for pushing the free bead of a tire into engagement with a rim, and Figure 7 is a view similar to Figure 1 showing the use of the device in connection with a rim employing a locking ring for securing the tire in position on the rim.

In carrying the invention into effect, I employ a pair of channel members 10 which are crossed at right angles to each other and suitably secured together at their point of intersection to provide a rigid base. These channel members are notched at their ends, as particularly seen in Figure 2, and mounted in said notches are pivoted hooks 11 secured to the channel members by rivets or other appropriate fastening devices. Thus, the four hooks are equi-distantly spaced and in conjunction therewith I employ a distributing ring 12, as will be later explained.

Positioned centrally upon the base provided by the crossed channel members 10 is a frustro-conical casing 13 having an enlarged circular bottom chamber 14 and extending through suitable ears on said chamber are bolts 15 detachably securing the casing to the base. Extending between the outer ends of the channel members and the upper end portion of the casing 13 are appropriate braces 13'.

Depending from the thickened top wall of the casing axially thereof is a cylinder 16 closed at its lower end and formed through the wall of said cylinder near the lower end thereof is an outlet 17 opening into the casing. Screwed through the wall of the casing in alignment with said outlet is a discharge valve 18 preferably provided with a winged head so that the valve may be conveniently manipulated manually.

Rising from the top wall of the bottom chamber 14 of the pump casing 13 diametrically opposite the valve 17 is a pump cylinder 19 having an inlet 20 communicating with said chamber and disposed in said inlet is a ball check valve 21. Extending from the lower end of the pump cylinder is a discharge pipe 22 which rises through the top wall of the chamber 14 and carries a casing 23 in which is disposed a ball check valve 24. Extending from the casing 23 through the wall of the pump casing 13 is a discharge pipe 25 screwed at its inner end through the wall of the cylinder 16 to communicate therewith.

Slidable in the pump cylinder 19 is a piston 26 and formed on the wall of the casing 13 near the upper end thereof are ears 27 between which is pivoted a lever 28 operatively connected with the upper end of the piston 26 by links 29. Thus, as will be seen, the lever 28 may be rocked for reciprocating the piston 26 and pumping a fluid from the chamber 14 into the cylinder 16, the casing 13 providing a reservoir for said fluid. Any suitable fluid may be employed.

Slidable in the cylinder 16 is a plunger 30 which is provided at its upper end with an enlarged circular head 31 and formed in the upper end portion of the plunger is an axial internally threaded socket 32. If desired, an appropriate gland 33 may be provided at the upper end of the casing 13 for the plunger and, as will now be at once appreciated, when the pump piston 26 is operated to pump fluid into the cylinder 16, as previously described, the plunger 30 will be forced upwardly, the valve 18 being closed. By opening this valve manually, however, the fluid will be permitted to drain from the cylinder 16, when the plunger 30 will drop.

Removably screwed into the socket 32 of the plunger 30 is a clamping bolt 34 which is provided with a preferably square head 35 and rising from said head axially of the bolt is a stud 36 apertured to removably receive a key 37. The head 35 is provided with an opening therethrough to removably accommodate a lever 38 preferably in the form of a tire iron having a bevelled end 39 and slidably insertable about the bolt beneath the head 35 thereof is a preferably circular clamping plate 40 having a slot 41 to freely accommodate the bolt.

In conjunction with the bolt 34 I provide a sweep 42 which, as best seen in Figure 1, is provided at its inner end with a crook 43 having aligned openings to freely accommodate the stud 36, the crook being limited against displacement from the stud by the key 37. Slidable on the sweep is a sleeve 44 which is provided at one side, as particularly seen in Figure 5 with an arm 45 terminating in a stud 46 and rotatable on said stud is a bullet shaped roller 47, the stud being upset at its free end for securing the roller thereon. At its opposite side, the sleeve 44 is provided with an L-shaped arm 48 and mounted between said arm and the sleeve in parallel relation to said sleeve is a roller 49 journaled by a screw pin 50, ball bearings being preferably provided for the roller.

Near its outer end the sweep 42 is, as particularly seen in Figure 2 provided with a series of longitudinally spaced openings 51 and mounted upon the sweep is a U-shaped lever 52 provided at one end with a hook 53 and pivotally connected at its opposite end with the sweep by a bolt 54 selectively engageable through the openings 51 so that, as will be appreciated, the lever may be adjusted longitudinally of the sweep. Pivotally connected with the inner end of the lever and with the sleeve 44 is a link 55 operatively connecting the parts. As shown, the hook 53 is adapted to engage the sweep for locking the lever against retrograde movement under the influence of inward pressure on the sleeve 44. By depressing the free end of the lever, however, said lever may be freed when, as shown by dotted lines in Figure 2 the lever may be swung for shifting the sleeve inwardly on the sweep.

In Figure 1 of the drawings, I have shown a conventional demountable wheel 56 in position on my improved device. The wheel shown is provided with a so-called drop center rim 57 and I have conventionally illustrated a tire at 58. Initially, the usual plate of the wheel hub is positioned upon the head 31 of the plunger 30, when the bolt 34 is arranged to extend through the usual center opening of said plate and engaged in the socket 32 of the plunger. The plate 40 is then slipped about the bolt beneath the head 35 thereof when the tire iron 38 is employed for tightening the bolt and thus tightly clamping the wheel in place on the plunger. The sweep 42 is then applied to the stud 36, when the lever 52 for the sleeve 44 is swung to shift said sleeve inwardly on the sweep. The bevelled end of the tire iron 38 is then utilized for lifting the uppermost bead of the tire 58 out of the rim, as suggested at the left of Figure 1, when the lever 52 is swung to shift the sleeve 44 outwardly on the sweep 42 and engage the roller 47 beneath said bead at the point where it is released, the hook 53 of the lever 52 being then engaged with the sweep for locking the sleeve against inward movement thereon. Thus, as will be appreciated, the sweep 42 may then be swung on the stud 36 for causing the roller 47 to lift said bead of the tire out of engagement with the rim throughout the inner circumference of the tire. Having thus disengaged one bead of the tire from the rim, the tire may be completely removed with facility.

In Figure 6, I have shown the manner in which the tire is replaced on the wheel rim. One bead of the tire is first engaged with the rim, as shown, leaving the other or upper bead free at the top edge of the rim. The sweep 42 is then reversed on the stud 36 from the position shown in Figure 1 so that the roller 49 is presented to the free bead of the tire at the lower side of the sweep. The lever 52 is then operated to shift the sleeve 44 outwardly on the sweep to locked position so that the roller 49 presses outwardly on the free bead of the tire. Accordingly, the sweep 42 may be swung on the stud 36 when the roller 49 will function to press the free bead of the tire outwardly as the roller advances so that said bead of the tire may be readily engaged with the rim.

In Figure 7 I have shown a demountable wheel 59 in position on the device, the wheel being provided with a rim 60 having a detachable locking ring 61 for normally securing the tire 62 in position on the rim. As will be observed, the wheel 59 is initially clamped by the bolt 34 between the head 31 of the plunger 30 and the plate 40 in such position that the locking ring 61 is disposed upwardly. The hooks 11 are then swung up to engage over the tire and the ring 12 is positioned beneath the free ends of the hooks so that the pulling stress of the hooks will be distributed by the ring circumferentially of the tire. The handle 28 of the fluid pump is then operated to raise the plunger 30 so that, as shown, the wheel 59 will be lifted and the upper side of the tire shifted away from the ring 61. Accordingly, the ring may then be readily removed.

Having removed the ring 61, the bolt 34 is loosened and the plate 40 displaced when the hooks 11 are disengaged from the tire. The wheel is then reversed side for side upon the device when the plate 40 is replaced, the bolt 34 tightened and the hooks 11 again engaged over the tire. Accordingly, by then operating the handle of the fluid pump, the wheel will be raised and the tire displaced from the wheel rim.

To replace the tire upon the rim, the wheel is first arranged upon the device in the position shown in Figure 7 when the tire is disposed about the wheel rim and the hooks 11 engaged over the tire. The handle 28 of the fluid pump is then operated to raise the wheel and thus effect the engagement of the tire about the wheel rim, after which the locking ring 61 is again applied. In any instance where a tire is to be removed from or replaced upon a demountable rim, an appropriate wheel is employed as a supporting frame for the rim.

Having thus described the invention, I claim:

1. A tire changer including a base, a wheel supporting plunger carried thereby, means for raising said plunger, clamping means carried by the plunger for securing a wheel thereon, and a sweep mounted to swing on said clamping means and provided with means engageable with the bead of a tire carried by the wheel.

2. A tire changer including a base, a wheel supporting plunger carried thereby, means for raising said plunger, clamping means carried by the plunger for securing a wheel thereon, and a sweep mounted to swing on said clamping means and provided at opposite sides thereof with means selectively engageable with the bead of a tire carried by the wheel, the sweep being reversible on said clamping means to selectively present said bead engaging means for use.

3. A tire changer including a base, a wheel supporting plunger carried thereby, means for raising said plunger, clamping means carried by the plunger for securing a wheel thereon, a sweep mounted to swing on said clamping means, means slidable on the sweep and engageable with the bead of a tire carried by the wheel, and a lever pivoted to the sweep and operatively connected with said bead engaging means, the lever being movable for sliding said bead engaging means on the sweep and being provided with means to engage the sweep for locking the lever against retrograde movement.

4. A tire changer including a base, a wheel supporting plunger carried thereby, means for raising said plunger, clamping means carried by the plunger for securing a wheel thereon, a sweep mounted to swing on said clamping means, a sleeve slidable on the sweep, rollers carried by the sleeve at opposite sides thereof and selectively engageable with the bead of a tire carried by the wheel, the sweep being reversible on said clamping means for selectively presenting said rollers for use, a lever pivoted to the sweep and operatively connected with said sleeve, the lever being movable for sliding the sleeve along the sweep, and a hook carried by the free end of the lever and engageable with the sweep for locking the lever against retrograde movement.

5. A tire changer including a base, a wheel supporting plunger carried thereby, means for raising said plunger, a clamping bolt carried by the plunger for securing a wheel thereon and provided with an upstanding stud, a sweep having a crook apertured to receive said stud and swingingly connecting the sweep with the stud, and means carried by the sweep and engageable with the bead of a tire carried by the wheel.

6. A tire changer including crossed members connected to form a base, a wheel supporting plunger carried by the base, means for raising said plunger, clamping means carried by the plunger for securing a wheel thereon, and a sweep mounted to swing on said clamping means and provided with means engageable with the bead of a tire carried by the wheel.

7. A tire changer including a base, a casing having an enlarged bottom chamber secured to the base and provided with an axial cylinder depending internally of the casing, the casing providing a fluid reservoir, a wheel supporting plunger reciprocable in said cylinder, means for pumping fluid from said reservoir into said cylinder for raising the plunger, clamping means carried by the plunger for securing a wheel thereon, and a sweep mounted to swing on said clamping means and provided with means engageable with the bead of a tire carried by the wheel.

RUDOLPH D. MAULIS.